March 22, 1966 R. B. ABBOTT ETAL 3,241,941
NECK MOLD APPARATUS FOR GLASS FORMING MACHINE
Original Filed July 25, 1957 7 Sheets-Sheet 1

INVENTORS
RAYMOND B. ABBOTT
RALPH H. OLSON
BY J. R. Nelson & D. T. Innis
ATTORNEYS March 22, 1966 R. B. ABBOTT ETAL 3,241,941
NECK MOLD APPARATUS FOR GLASS FORMING MACHINE
Original Filed July 25, 1957 7 Sheets-Sheet 2
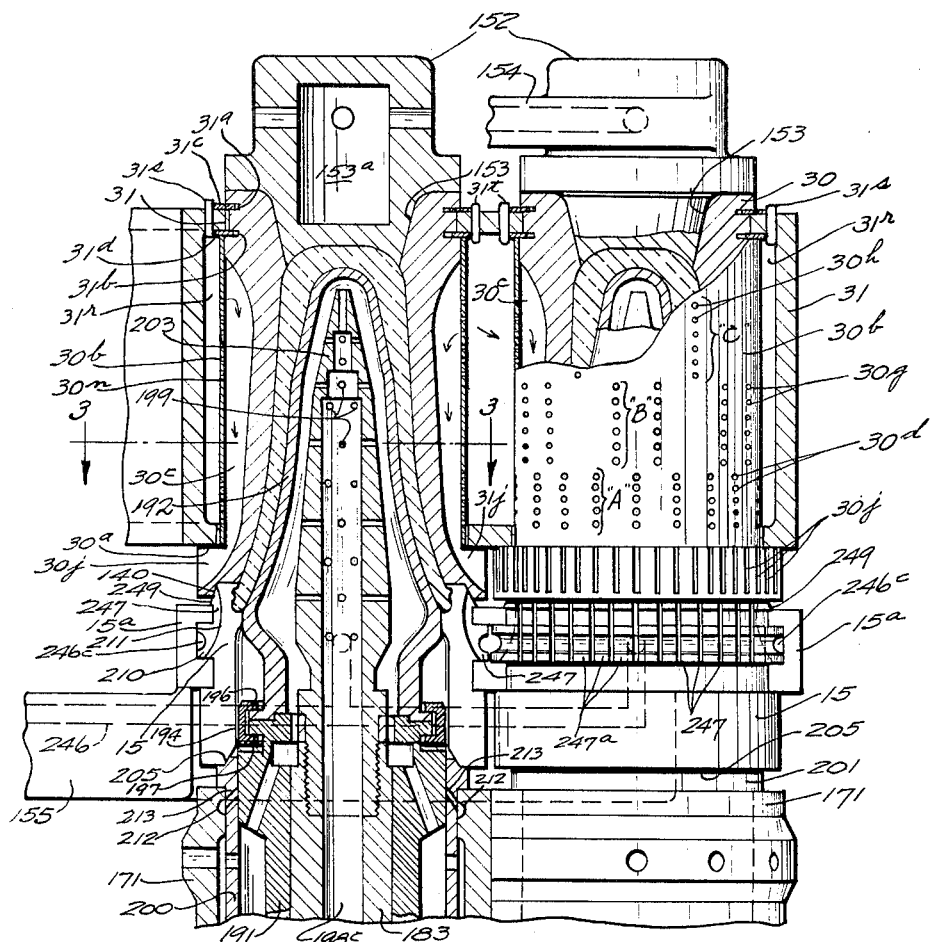
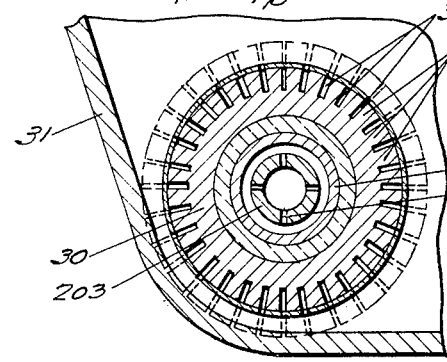
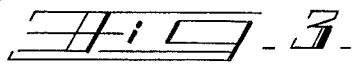
INVENTORS
RAYMOND B. ABBOTT
RALPH H. OLSON
BY J. R. Nelson & D. T. Innis
ATTORNEYS

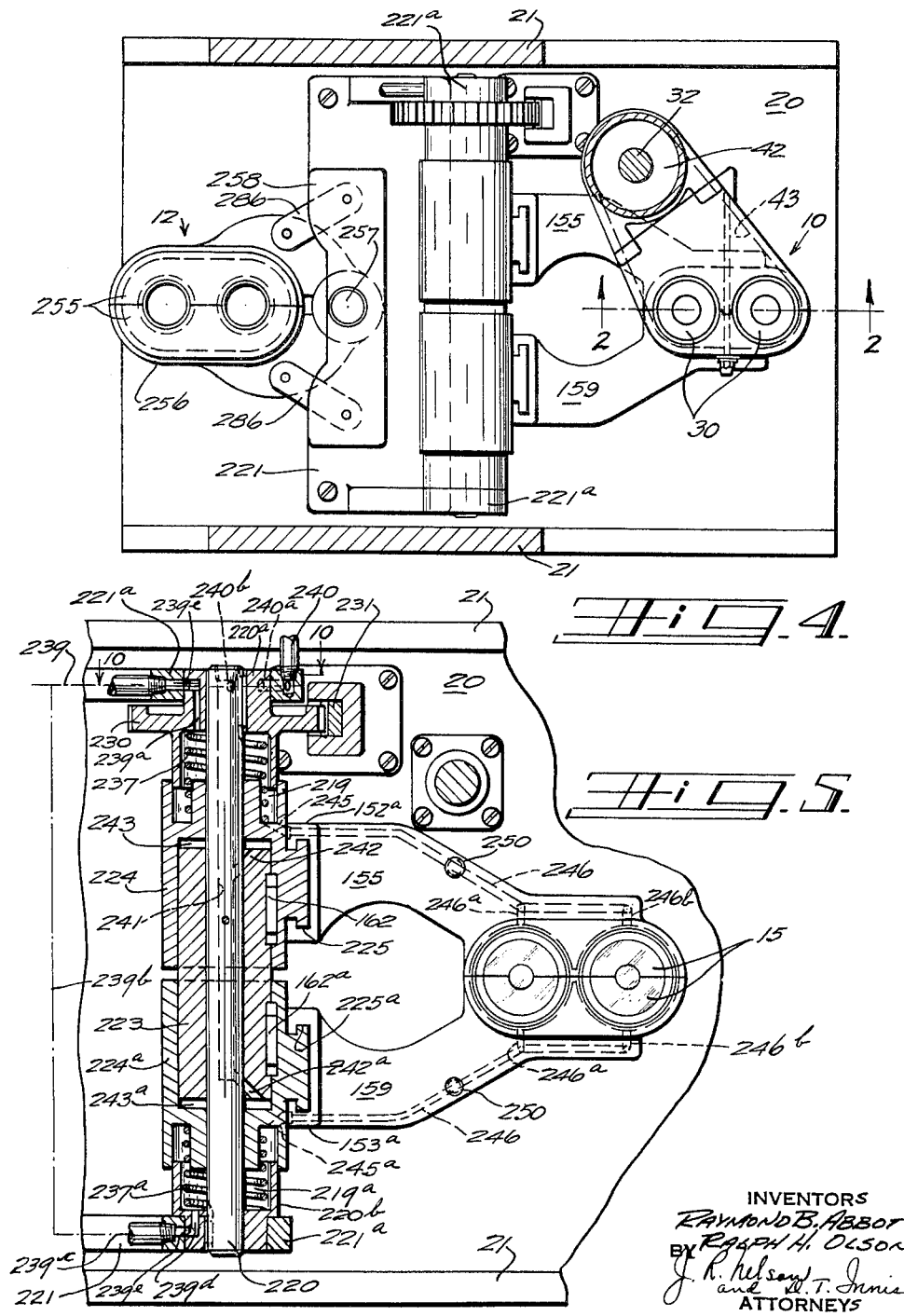

March 22, 1966    R. B. ABBOTT ETAL    3,241,941
NECK MOLD APPARATUS FOR GLASS FORMING MACHINE
Original Filed July 25, 1957    7 Sheets-Sheet 4

INVENTORS
RAYMOND B. ABBOTT
RALPH H. OLSON
BY J. R. Nelson
and D. T. Innis
ATTORNEYS

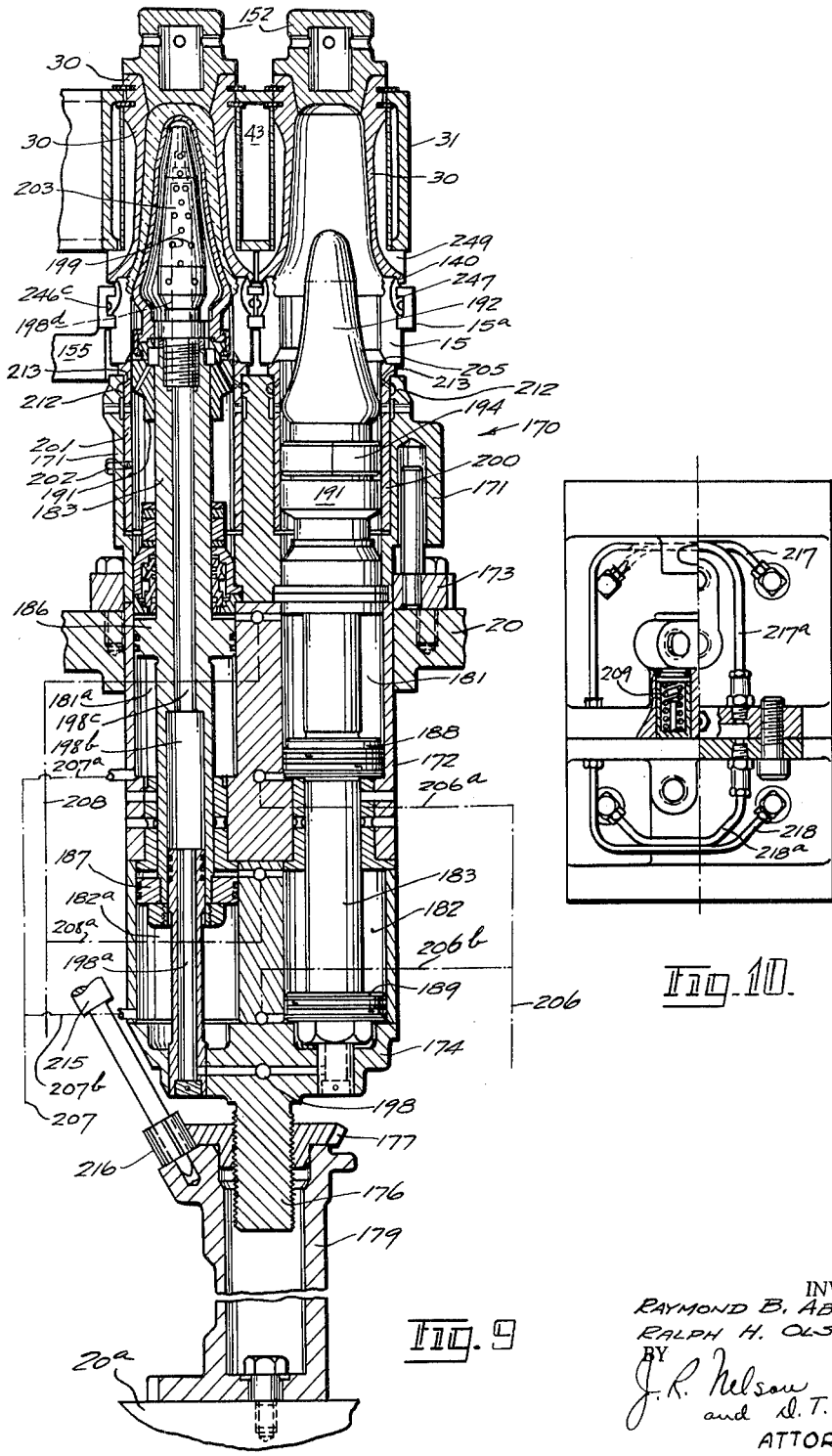

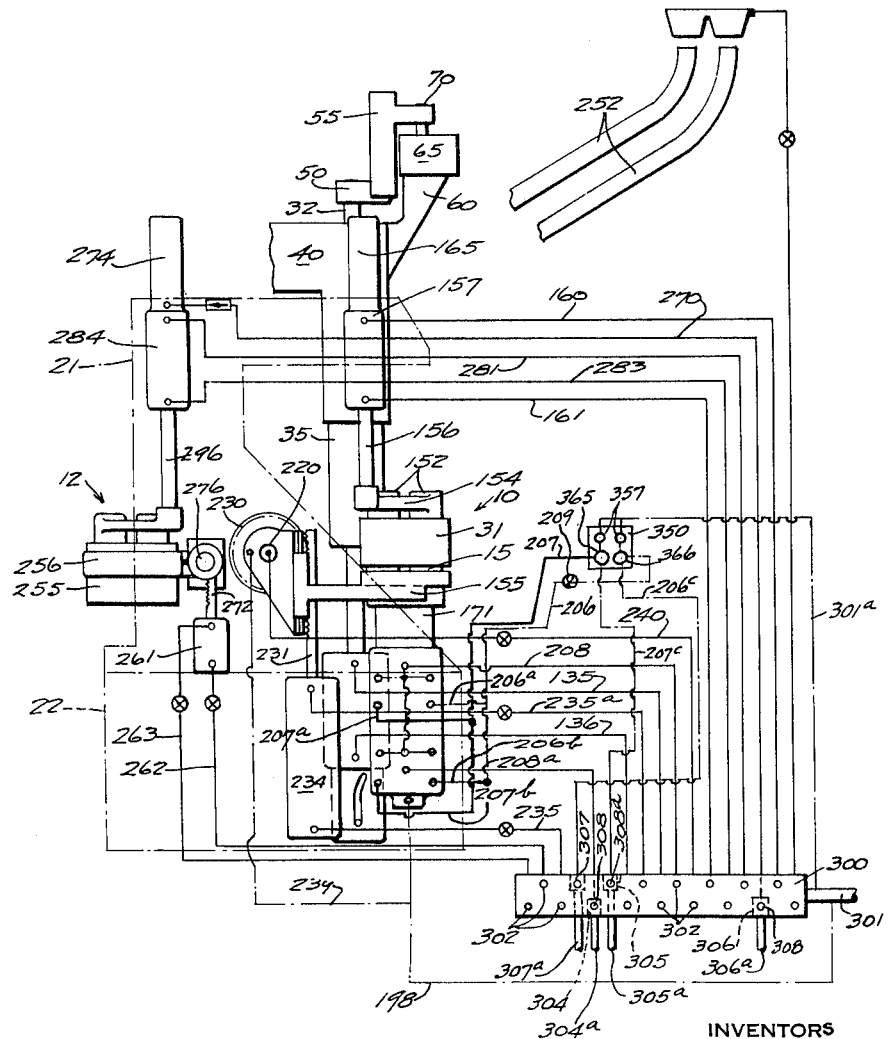

March 22, 1966  R. B. ABBOTT ETAL  3,241,941
NECK MOLD APPARATUS FOR GLASS FORMING MACHINE
Original Filed July 25, 1957  7 Sheets-Sheet 7

INVENTORS
RAYMOND B. ABBOTT
RALPH H. OLSON
BY
J. R. Nelson & D. T. Innis
ATTORNEYS ated Mar. 22, 1966

3,241,941
NECK MOLD APPARATUS FOR GLASS FORMING
MACHINE
Raymond B. Abbott, Toledo, Ohio, and Ralph H. Olson, Geneva, Switzerland, assignors to Owens-Illinois Glass Company, a corporation of Ohio
Original application July 25, 1957, Ser. No. 674,149, now Patent No. 3,024,571, dated Mar. 13, 1962. Divided and this application Aug. 14, 1961, Ser. No. 131,190
5 Claims. (Cl. 65—235)

This application is a division of our copending application Serial No. 674,149, filed July 25, 1957 now Patent No. 3,024,571 issued March 13, 1962.

Our invention relates to the molding of molten glass into hollow shaped articles and in particular relates to the pressing and blowing method of producing glass articles.

The glass industry has recognized the troubles inherent in the operation of two-piece, open and shut molds since the advent of the automatic machine. In such molds the matching seams are difficult to maintain, both in the mold equipment and the machine parts which carry the molds. Further, such matching surfaces form a material heat barrier or block and presents an uneven heat or temperature unbalance which is impossible to overcome.

On the well-known "IS" machine, these troubles have compounded themselves in recent years. With the application of the well-known "62" process (Rowe, 2,289,046) to said machine and the trend to lightweight and higher speeds, these problems have been further increased.

In order to offset these difficulties this present invention contemplates the provision of a new type of mold, both in the parison and neck molds as well as the provision of a completely new requirement for the cooling system therefor. For example, for double and single gob operation, the outside surface areas of these molds must be cooled evenly about the vertical axis thereof. The cooling must be continuous and uniform over the entire forming cycle. The system must be capable of applying differential cooling, that is, vertically arranged zones of cooling through the length or height of the mold and the system must be capable of or have the capacity to remove at least double the heat removed in ordinary "IS" cooling.

Further, provision of such cooling must be an independently controllable system and the application of the coolant to the molds must be in controllable and regulable patterns and of equalized pressure. Through such cooling the control of both the horizontal and vertical distribution of the glass in the walls of the article may be obtained and maintained. In addition, to obtain such control, sharp temperature gradients are required through the length of the parison and these are obtainable with the cooling system herein disclosed. In any instance the amount of cooling in either the blank or neck mold must be such that the actual working or production rate of one is equal to the other.

In essence this apparatus concerns the press molding of a parison or blank of molten glass, either singly or in pairs, and the use of an inverted seamless blank mold for forming same. Additionally, there is the usual blow molds positioned at a blowing station and an apparatus for transferring the shaped parisons from the blank forming station to the blowing station.

In the usual stationary section machines such as disclosed in the patent to Ingle, No. 1,911,119, the parisons are formed inverted, but their formation is accomplished by the usual blow and blow method rather than by the press and blow method. This present apparatus contemplates forming parisons in the inverted position by a press method and reverting these parisons during the transfer to the blow mold.

Among the objects of the invention is the provision of new and highly effective cooling for the neck molds.

Another object is to utilize high pressure fluid to maintain the neck molds closed during the forming operation.

Other objects will be in part apparent and in part pointed out hereinafter.

In the drawings:

FIG. 2 is a sectional elevation taken at line 2—2 on FIG. 4 through the blank mold head illustrating the plural blank mold structure and cooling devices;

FIG. 3 is a sectional plan view taken at line 3—3 on FIG. 2 which illustrates the mold wall structure with its cooling channels;

FIG. 4 is a plan view of the blank, neck and blow molds taken approximately at line 4—4 on FIG. 1;

FIG. 5 is a sectional view taken at line 5—5 on FIG. 1 and illustrates the neck mold fluid pressure closing mechanism;

FIG. 9 is a sectional elevational view through the parison forming plunger mechanism;

FIG. 10 is a view of the oiling system attached to the outside of the parison plunger cylinders;

FIG. 11 is a fluid piping diagram for the apparatus; and

A glassworking machine embodying the present invention is illustrated as being a machine wherein each unit or section embodies a movable annular blank mold, a stationary partible blow mold, and a split neck mold adapted to cooperate alternately with the said blank mold and blow mold to transfer a blank or parison from the blank mold to the blow mold; a gob delivery mechanism "B" for successively supplying charges to each forming section; and a pressure control mechanism "C" for adjustably regulating the application of actuating fluid pressure to the several operating portions of said forming section, in proper sequence and in timed relation to each other and the gob feeding device.

Figure 1:
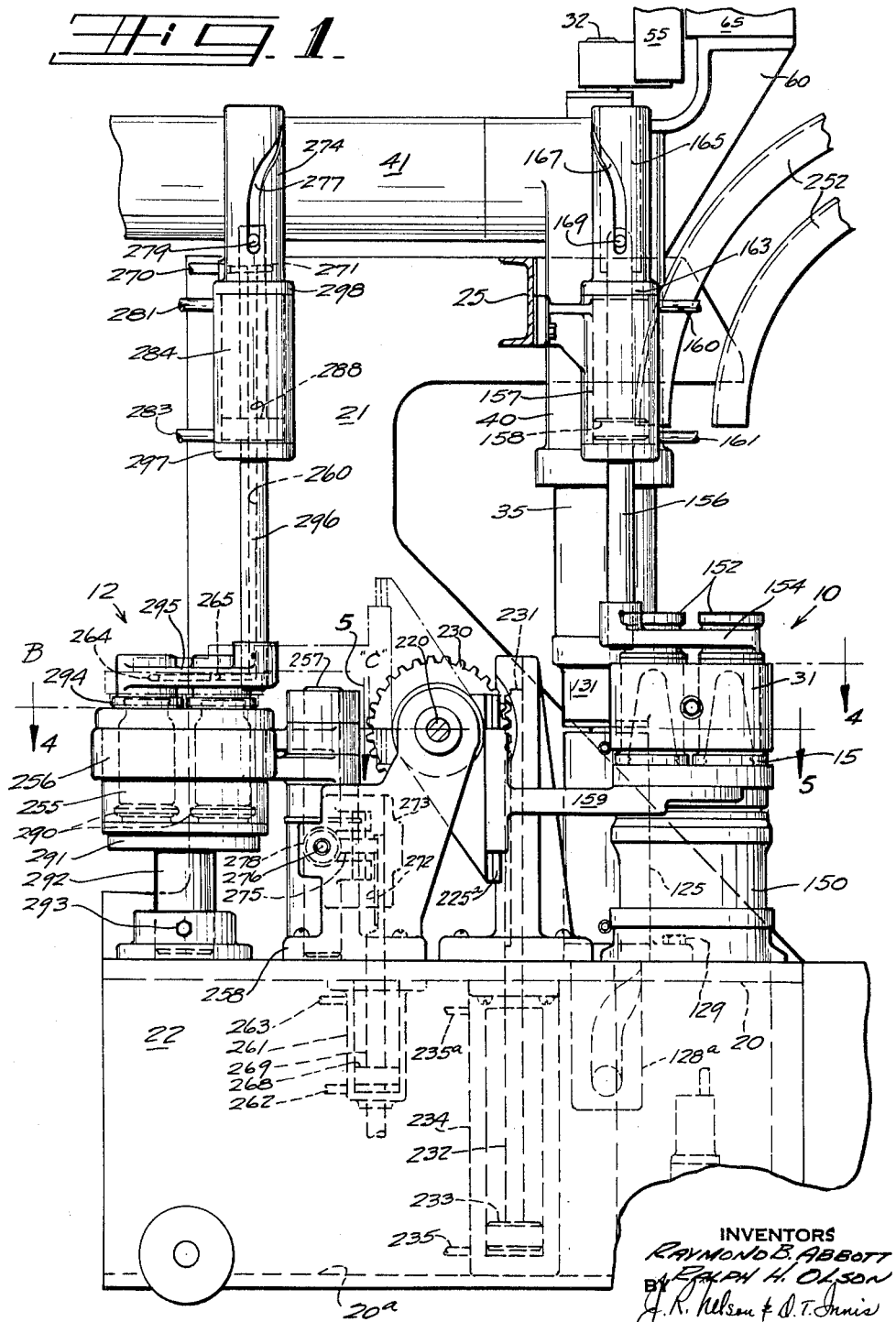
FIG. 1 is an elevational view illustrating the mold arrangement and relationship of this forming machine.
Figure 6:
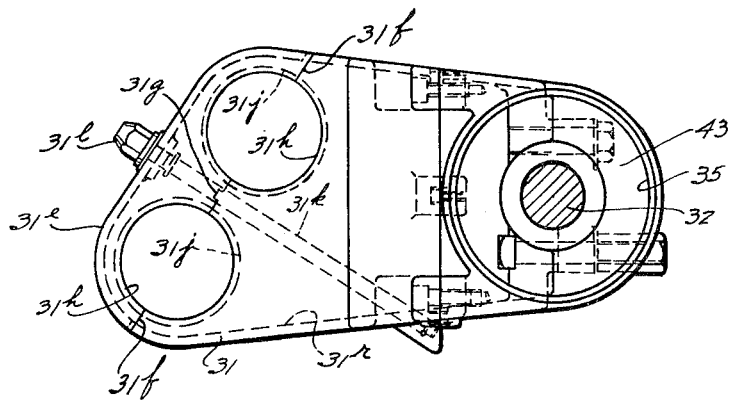
FIG. 6 is a plan view of the blank mold holder illustrating its assembly structure.
Figure 7:
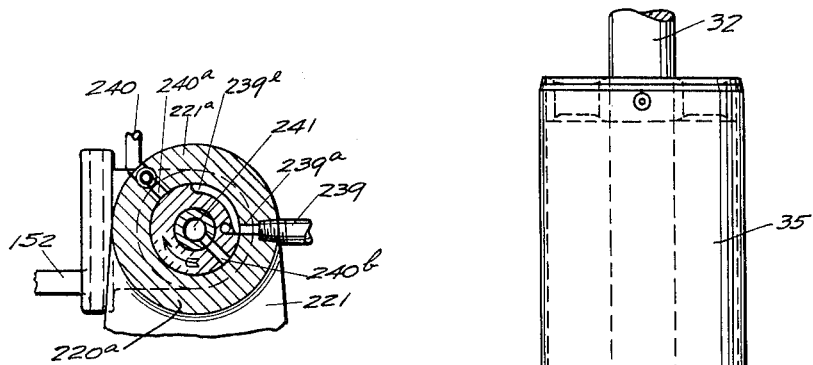
FIG. 7 is a section taken at line 7—7 on FIG. 5 and illustrates the conduits for providing auxiliary pressure for closing the neck molds.

This forming section may be provided as one of a series of units arranged either singly, in a straight line beneath the feeder orifice or disposed in some other arrangement about the vertical center line of the feeder orifice or in any desired geometric pattern. In addition these glass forming units may also be arranged upon a table for rotary movement beneath the gob feeder. With particular reference to FIGS. 1 and 2, the forming section embodies an annular blank mold unit 10 which remains permanently in inverted position, but which is movable into and out of a parison forming position.

In this present disclosure the drawings illustrate a plural mold cavity structure, but of course the invention is applicable to a single mold structure.

Figure 8:
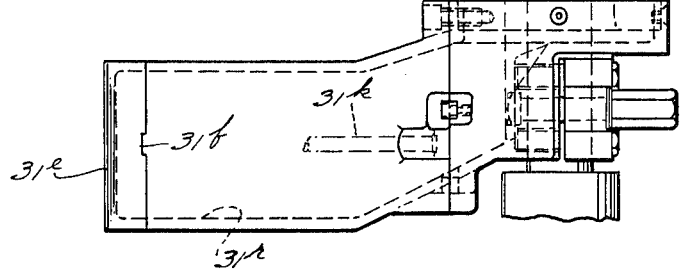
FIG. 8 is an elevational view of the blank mold holder structure.

A blow mold unit 12 of the split mold type is permanently disposed in neck-up position at the final blowing station, and a split neck ring 15 is adapted to swing about a horizontal axis from the blank or parison forming station to transfer and invert a parison into upright blowing position at the blow mold station for final blowing into a completed article. The mold units 10 and 12 and the neck ring holder 15a are suported upon a platform 20 which in turn is connected to and supported by upright frame structures 21 mounted upon a base 22. These frames 21 are interconnected at their upper ends by a channel member 25 (FIGS. 1, 2, 8). Each parison mold unit is comprised of a pair of annular unsplit shaping molds 30 mounted in a hollow holder 31 which is in turn mounted upon and attached to a vertical shaft 32. The hollow holder 31 is formed at one end in a hollow sleeve portion 35 having inner support bearings 36 and 37 attached to shaft 32. The sleeve portion 35 is adapted for telescopic movement in a hollow member 40 and thus provides a continuous conduit for cooling air from a source of supply (not shown) through channels 41, 42, and 43, to and around the molds 30 (FIG. 2) for the cooling or temperature control thereof. This blank mold supporting member is of a specific structure which will be described in detail later on in this description.

The blank molds 30 and their support 31 are adapted for both vertical and horizontal motion, with the shaft 32, to bring them to the operative forming position and then to an inoperative position above and to one side of the operative position. The upper end of shaft 32 has mounted thereon and attached thereto a bracket 50 which carries in its outer end a pivot block 52 pivoted at 53 on said bracket 50. The pivot block 52 is adapted for vertical sliding movement in slide block 55.

The swinging, raising and lowering of the blank mold support 31 and the blank mold 30 is accomplished through a cylinder 125, a piston 126 attached to the piston shaft 32, a cam roll 127 formed on the lower end of shaft 32 and a control cam 128 formed in the cylinder head 128a attached to the lower end of cylinder 125. The cylinder 125 is mounted and retained on the base 22 by the bolts 129 (FIG. 2). Suitable actuating pressure is supplied to cylinder 125 through pipes 135 and 136 to raise, lower and swing support 31 with its molds 30.

During the charging of the blank molds 30 at the parison forming station, the neck molds 15 occupy a position beneath and in registered contact with the blank molds 30. This registration is obtained maintained by the mating angular surface areas 140 (FIG. 2) so that each blank mold 30 accommodates itself to the position of its respective neck ring 15. The neck molds 15 are of the split type and the halves thereof are carried upon support arms 155 and 159. These neck molds 15 are so mounted upon their respective supports as to have little, if any, horizontal or sliding motion thereon. The blank molds 30 are movable in any direction with respect to their support 31. Reference to FIG. 2 will show that the blank molds 30 can move horizontally with respect to support 31 due to the clearance provided at 31a and 31b. Guide plates 31c and 31d attached to the top end of support 31 retain the molds 30 in the support but permit limited relative movement therebetween in both the vertical and horizontal planes as will be more fully disclosed hereinafter.

Formation of parisons in this present mechanism is accomplished by the well-known press method. The charges of glass being provided by the usual glass feeding device are directed to the parison molds 30 through gob chutes 252 and 252a adapted to guide the charges to and through the open upper ends of the blank molds 30. Concurrent therewith, but following the charging of the molds, baffle plates 152, mounted on an arm 154, are swung about shaft 156, through activation provided by cylinder 157 and cam 167 and brought into registration with and seated upon the molds 30.

The pressing of the gobs of molten glass to form blanks or parisons is obtained through the following mechanism: A vertical, fluid pressure twin cylinder unit 150 is mounted upon the base 22, below and in alignment with the blank and neck molds 30 and 15 respectively, at the charging position of the machine. When the blank molds 30 are in forming position, as shown in FIGS. 1, 4 and 9, the open upper end thereof is adapted to be closed by a cover or baffle plate 152 which is shaped to fit within complementary depressions 153, formed in the upper end of the blank molds 30. The baffle plates 152 are provided with internal cavities 153a into and through which cooling fluid may be passed.

The arm 154 which supports the baffles 152, is secured to the lower end of a vertically reciprocable piston rod 156, which extends upwardly through a fluid pressure cylinder 157 and is provided with a piston 158 (FIG. 3). The cylinder 157 is suitably mounted on the cross channel 25 and is supplied with valve controlled fluid under pressure through pipes 160 and 161, in order to raise and lower the baffles or cover plates 152 with respect to the blank molds 30.

The upper portion of the piston rod 156 extends through and is slidably mounted in an upper cylinder head 163, formed with an upwardly extending cam sleeve 165. This sleeve functions as a protective housing for the top portion of the piston rod 156, and is provided with a helical slot 167 into which projects a cam pin 169 carried by the piston rod 156. As the piston moves upwardly, under the pressure admitted through pipe 161, to elevate the mold baffles 152, the cam slot 167, acting on the pin 169, imparts a partial rotation to the rod 156 which is sufficient to swing the baffles 152 in a lateral direction and out of the path of the oscillating neck rings 15. Upon the downward stroke of piston 158, the baffles 152 will return to closing position in cooperation with the blank molds 30.

During the mold charging and blank forming operations, the neck rings 15 occupy a position beneath and in alignment with the blank molds 30 (FIGS. 2, 3, and 5) and are provided on their upper ends with an angular surface area 140 which is adapted to cooperate with complementary recesses in the lower ends of the blank molds 30, thereby maintaining an exact registration between the neck rings 15 and blank molds 30 during the blank forming operations.

The pressing operation is supplied by the following mechanism (FIG. 9): a cylinder unit 170 comprised of a pair of vertical tandem cylinders having interconnected upper and lower cylinder sections 171 and 172 of the twin cylinder unit 170, are mounted upon an adjustable base 174. Base 174 is formed with a threaded portion 176 mounted in and extending through an adjusting pinion 177 supported in a bracket 179. This twin cylinder unit 170 is supported in a bearing member 173 mounted on the platforms 20 and 20a forming part of the base 20.

The cylinder section 172 has formed therein, pairs of vertically disposed tandem cylinders, one pair being cylinders 181 and 182, and the other pair being cylinders 181a and 182a. A piston rod 183 extends through each vertically aligned tandem pair of cylinders 181, 182, and 181a, 182a. Each piston rod 183 is provided with pairs of pistons 188, 189 and 186, 187 respectively. Disposed at the top of and fastened to each piston rod 183 is a head 191 which supports a plunger 192 in aligned freely floating relation thereto. A split ring 194 is so formed internally as to override the shoulders 196 and 197 of each plunger 192 and head 191 (FIG. 2), thus locking them together in such manner as to prohibit relative vertical movement between said plunger and head with respect to each other, but permitting relative horizontal movement with respect to each other.

Ported sleeve members 200 and 201 are inserted in the upper ends of cylinders 181 and 181a and fastened as at 202. These sleeves are tapered at their outer upper ends, as at 205 (FIG. 2), to align and locate the neck mold rings 15 with respect to the cylinder sleeves 200 and 201, in order that when the blank molds 30 are swung into the charging position and lowered upon the neck rings 15, they may, due to their floating action, be thus automatically aligned with respect to the neck mold and retained in this aligned position.

When the plungers 192 are moved upwardly into glass pressing position (FIG. 2), an external straight portion 210 on each said plunger will move into contact with a similar straight portion 211 formed on the inner surface of the neck rings 15. As above described, the plungers 192 may move freely in the horizontal plane and due to this fact they will be thus automatically brought into perfect alignment with the neck rings 15.

Air for cooling the external surface areas of the plungers when they are in their down position, may be provided through the openings 212 and ports 213 formed respectively in the walls 171, and the sleeves 200 and 201. Cooling air for the internal areas of plungers 192 is provided through conduits 198 in the cylinder base 174, conduits 198a, 198b, 198c and 198d. Conduit 198d leads to a series of openings 199 formed in the nozzle 203. Said openings 199 are formed in a predetermined pattern adapted to the particular shape of plunger and to give a desirable cooling pattern to the plunger (FIGS. 2 and 9).

The proper vertical or operating position of the neck ring guides 205 and the press plungers 192 with respect to the blank and blow molds, may be obtained by means of a crank 215, pinion 216, and a ring gear 177. By rotating the crank 215, the gear 177 will be rotated and through the threaded connection it has with member 176 both the neck ring guides and plungers may be moved upwardly or downwardly as a unit as the particular situation may demand.

The reciprocation of the plungers 192 to and from pressing position is obtained through valve controlled fluid pressure thereto as will be later described. The plungers are raised into pressing position by high pressure air admitted beneath the pistons 186, 187, 188, and 189 through separately controlled lines 206 and 207 respectively. The plungers 192 are lowered by pressure admitted above the pistons 186, 187, 188, and 189 by a single valve control to line 208. A valve block 350 is provided which controls the application of high pressure air to the pressing plungers. A check valve 209 is provided in the line 206 which checks the exhaust of pressure beneath pistons 186, 187, 188, and 189, and acts to prevent impact shock at the end of the down stroke of these pistons (FIG. 13). An oil chamber 214 is provided from which oil lines 217 and 217a lead to the upper cylinders 181 and 181a respectively. Oil lines 218 and 218a lead respectively to the lower cylinders 182 and 182a (FIG. 10).

Figure 12:
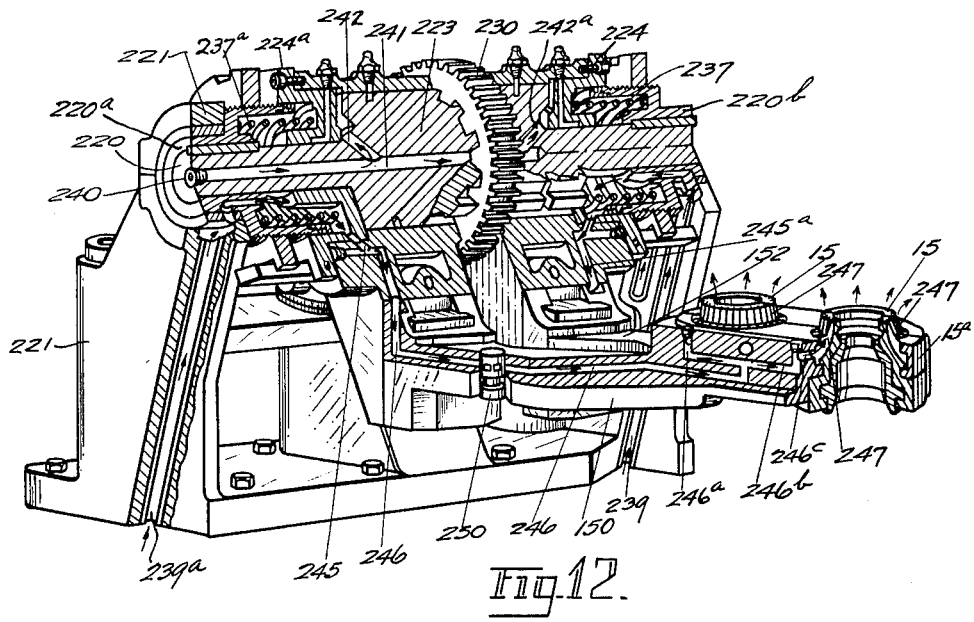
FIG. 12 is a part sectional perspective view of the parison transfer mechanism showing the cooling air conduits.

The neck mold inverting mechanism is best shown in FIGS. 4, 5 and 12. This mechanism is comprised of a pair of support arms 155 and 159 fulcrumed on a shaft 220 mounted in bearings 221a formed on bearing bracket 221. The bearings 221a support the shaft 220 in a horizontal position. The shaft 220 is provided with an enlarged portion 223, upon which is mounted a pair of sleeves 224 and 224a, each sleeve adapted for both rotary motion with and sliding movement along the length of shaft 220. Each sleeve is provided with a slideway 225 and 225a formed thereon in such a manner that when the neck molds are in either of their two operative positions, these slideways will be disposed in a vertical plane. The arms 155 and 159 are also provided with slide formations 152a and 153a adapted to cooperate with the slideway portions 225 and 225a of the sleeves 224 and 224a. This slide and slideway structure will permit the neck rings 15 to be adjusted vertically at either of the operative positions to bring the neck rings 15 into proper cooperative vertical position with respect to either the tapered formation 205 on the upper end of the plunger cylinder sleeve 200 or into proper vertical position with respect to the top surface of the blow molds 12. The rotation of the neck mold arms 155 and 159 about the axis of shaft 220 to transfer the parisons from their forming station to the blowing station is accomplished through a pinion 230 and a vertically disposed pinion rack 231 positioned in meshing contact with the pinion 230. The rack 231 is formed on the upper end portion of a piston rod 232, attached to a piston 233 and adapted for vertical movement in a cylinder 234. Air inlet pipes 235 and 235a are adapted to permit pressure air, under valve control, to enter the cylinder 234 at the bottom and top ends thereof respectively.

It is necessary that the neck rings be held tightly closed at the parison forming station and that they be opened to release the parison at the blowing station. Normally the neck rings are held closed under spring pressure provided by springs 237 and 237a disposed between the ends of bearing brackets 221a and the outer ends of the sleeves 224 and 224a. These springs normally hold the faces of the halves of the neck rings 15 in tight contact and with sufficient pressure to support a formed parison. However, when the molding members are in the position shown in FIG. 2, which is the position for shaping the parison under molding pressure, then further pressure must be applied to these neck rings 15 to insure that they remain tightly closed. To accomplish this, air under pressure is continuously supplied through the conduit 239 to apply a pressure over and beyond that supplied by the above mentioned springs 237 and 237a. This pressure is applied to the outer ends of the sleeve members 224 and 224a to cause them to function in the manner of pistons, and is supplied thereto through the following mechanisms.

Continuous pressure air is supplied from conduit 239 to channels 239a, 239b, 239c, and 239d into chambers 219 and 219a when the neck mold arms 155 and 159 are in the position shown in FIGS. 4 and 5 to insure holding the neck rings 15 closed against the glass pressing pressure. After the pressing operation is completed and the transfer of the parison is in progress, this air pressure may be and generally is continued through at least a portion of the transfer movement for cooling purposes which will be later described. This continued air application is accomplished through the extension of channel 239e which permits flow of pressure through approximately 90° of transfer rotation. When opening 239a reaches the end of channel 239e, the high closing pressure is released and the closing of the neck rings is returned to the control of the springs 237 and 237a. Through this arrangement the high pressure closing of neck molds 15 is obtained automatically through rotation of the arms 155 and 159 about shaft 220. This same air control structure is provided at both ends of shaft 220 in order that like pressure may be supplied to both of the chambers 219 and 219a. This closing pressure is then transmitted through arms 155 and 159 to the halves of the neck rings 15 and holds them tightly closed during the interval the plunger 192 is pressing the glass in the molds 30 as illustrated in FIG. 2.

When the neck molds 15 carrying the parisons, are rotated and reach the blowing station, it then becomes necessary to open these neck rings 15 and release the parisons to the control of the blow molds 12. In order to accomplish this, valve controlled pressure air is supplied to a conduit 240 and channel 240a formed in the stationary portion of bearing 221a. When shaft 220 and bearing members 220a and 220b are rotated, it brings a channel 240b into register with channel 240a. This registration admits air into a channel 241 formed through the center of the shaft 220 which leads to a pair of ports 242 and 242a, opening into chambers 243 and 243a. Thus when the pressure is discontinued in the chambers 219 and 219a, and air pressure is supplied through ports 242 and 242a, the sleeves 224 and 224a are caused to move away from each other, thus opening the neck rings 15 by sliding them in the horizontal plane along the splines 162 and 162a of part 223 (FIG. 5). This opening of the neck rings releases the parison to the confines of the blow mold 12 which has been closed just prior to the release of the parison. The piston 233 of the transfer cylinder 234 is then subjected to air under pressure admitted through pipe 235a to return the neck rings 15 to the parison forming position. During this returning motion, the pressure in chamber 243 and 243a will be released, the springs 237 and 237a will then cause the neck rings to close. Air under pressure will be again applied in chambers 219 and 219a and as the port 239a connects again with the channel 239e, pressure will be again applied to the neck rings 15 as the neck rings return to the forming position.

In order that high speed production may be obtained and maintained it is, of course, necessary that the several molds be cooled during the forming operation and in particular the neck rings 15 should be cooled during the molding operation because with this particular mechanism, the glass forming molds are being utilized at exceptionally high speeds. For example, at speeds approximately four times faster than is normally accomplished with similar mechanisms. In order to accomplish this necessary cooling, the air which is supplied under high pressure through pipes 239 and 239a, to apply additional pressure on the neck molds in their closed positions, is also utilized to provide a high velocity cooling medium for the neck rings 15 (FIGS. 4, 5, and 12). This is accomplished by providing relatively small high velocity ports 245 and 245a, leading from the chambers 219 and 219a respectively, surrounding the springs 237, and connecting into conduits 246, 246a, and 246b formed in the support members 155 and 159 and leading into the circular channels 246c surrounding the outer wall surface area of the neck rings 15 (FIG. 2). A series of equally spaced vertical slots 247 are formed in the outer peripheral surface areas of the neck rings 15 and each of these slots bisect the circular channel 246c formed in and surrounding the neck rings 15. The neck ring holders 15a surrounding the neck rings 15, cooperate with this circular channel 246c to enclose and form same and to cause the high pressure and high velocity cooling air flowing through this channel to flow upwardly through slots 247. These slots 247 and the ribs 247a formed therebetween are spaced around the outer surface areas of the neck rings open outwardly at the openings 249 located (FIG. 2) between the bottom end of the blank molds 30 and the upper surface of the neck ring holders 15a. The slots 247 and ribs 247a are all of equal dimensions. In this manner the neck rings are cooled in an equalizing manner, by high velocity air, applied throughout their entire circumferential area and during the major portion of the time they are in actual glass contact. The application of cooling air to the neck molds continues through a portion of the transfer of the parison and also prior to the return of the neck mold to and during the pressing operation.

An air metering valve 250 is provided in each of the air conduits 246 in the neck mold arms 155 and 159 to permit regulation of the air flow to the slots 247.

The hollow mold support member 31 (FIG. 2) is adapted to support one or more annular blank molds 30 and in this present instance, two blank molds are shown. Each single piece annular parison mold 30 is provided, at its upper end, with a pair of grooves 31a and 31b into which are fitted opposed thin semi-circular rings 31c and 31d. These split rings are retained in their operative positions by means of a series of retaining pins 31s and 31t. The width of the grooves 31a and 31b is greater than that of the rings 31c and 31d and the vertical spacing between the grooves is greater than the thickness of the top surface of the mold holder 31. The vertical spacing between the rings 31c and 31d and the lower shoulder 30a of each mold 30 is greater than the height of the mold holder 31. These excess dimensions thus permit the molds 30 to have limited freedom of vertical movement with respect to the holder 31 when or at the time molds 30 are seated upon the neck molds 15.

The cooling air for the molds 30 is brought from a source of supply (not shown) through conduits 40, 41, 35, into passage 31r of mold holder 31, thence through the several groups of openings A, B, and C in the perforate members 30b into the grooves or depressions 30c between ribs 30n, flowing downwardly along said grooves and ribs and exhausting at the openings 30j beneath the mold holders 31.

In this manner the molds 30 are cooled in vertically juxtaposed adjacent zones each of which may be exactly controlled as to any desired temperature and pattern. Also, the perforate pattern which is individual to a particular shape or design of a mold cavity, may be changed or varied by merely providing a different member 30b which in turn may be provided with any desired pattern of openings A, B, and C. These members are interchangeable both for different cooling patterns and for each different type of mold 30.

When the neck rings 15 are actuated, as heretofore described, to transfer the formed parisons to the finish blowing station, the parisons are deposited in the open blow mold 12 in a neck-up position. The blow mold 12 (FIG. 1) in the present instance, is at a fixed station and comprises two cooperating sections 255 which are detachably secured to mold holders 256. The mold holders are hinged upon a pin 257 which is carried by housing 258 having trunnions 259 provided at each end thereof, and which are secured to the side frame elements 260.

The blow mold halves 255 open and close at proper times by means of fluid pressure which is admitted to a vertically disposed cylinder 261 through pipes 262 and 263.

The lower portion of the blow mold is closed by bottom plates 290 which are supported by a holder 291. This holder is adjustably mounted on a support 292 carried by the base 22 of the machine. The bottom plate 290 may be adjusted vertically with respect to the blow mold by loosening the clamp 293.

The upper portion of the blow mold is adapted to be closed by blow heads 294, which are detachably secured to a hollow arm 295 by any suitable connection, such as a bayonet joint connection. Each blow head is provided with an opening 296a which registers with a nozzle formed on the arm 295. As shown in FIG. 1, the arm 295 is secured to the lower end of a piston rod 296 which extends upwardly through heads 297 and 298 of a fluid pressure cylinder 284 and is provided with a piston 288. This cylinder is carried by one of the side frame elements 21 and is supplied with fluid under pressure at points above and below the piston through pipes 281 and 283 respectively.

Blowing pressure is controlled by and delivered from a valve bank 300 to the parisons when in the blow mold 12, through a pipe 270 which communicates with a circular recess 271 provided in the upper cylinder head 298.

In FIG. 1, the blow head 295 is shown as contacting the top of the blow mold 12 during the finish blowing operation, the neck ring 15 having been returned to the blank forming station. By this arrangement, the blowing operation may overlap the succeeding blank forming operation, thus permitting the ware to remain in the blow mold for a relatively longer interval of time.

The fluid pressure control mechanism "C" as shown in FIG. 11, is approximately the same as that shown in the Ingle Patent No. 1,911,119 previously mentioned.

This mechanism comprises a valve chest 300, which is supplied with air under pressure from a source of supply (not shown) by pipe 301, and with which all of the pipes communicate that supply valve controlled fluid pressure to the operating cylinders previously described, with the exception of the pipes 198 and 239, and 301a. Pipes 198, 239 and 301a connect directly with the supply pipe 301. Communication between the valve chest 300 and the operating mechanism pipes is controlled by valves 302 and 303. The valve chest 300 is provided with chambers 304, 305, 306, and 307 (shown in dotted lines on FIG. 11) which are respectively supplied with desirable operating pressure for the finish blowing pressure and plunger valve block 350 by pipes 304a, 305a, 206a, and 307a, and with which the pipes 208a 207c, 270, and 206c communicate respectively. Communication between these last-mentioned pipes and their respective chambers is controlled by poppet valves.

The several valves above-mentioned of the control mechanisms of the shaping machine, are opened at the desired time intervals by pairs of studs, which are mounted in the same vertical plane and in a series along the outer surface of a constantly rotating horizontally disposed timing drum, through the medium of levers which are pivotally mounted on the valve chest. The valves are maintained open until operated by the mentioned studs on the surface of the timing drum. The duration of the time intervals between the opening and closing of the several valves are determined by the distances between the studs of each pair thereof.

The timing drum is driven in timed relation with the feeding mechanism.

In the operation of the apparatus described above, mold charges of molten glass are delivered by a feeder through the funnel 252a and are received in succession by the trough sections 252 ad delivered into the blank molds 30. The machine then proceeds to fabricate the mold charges which it receives, first by applying a pressing action to the glass in the combined neck and blank molds 15 and 30, then stripping the blank mold, and swinging the bare parison by the neck rings 15 to an upright position at the finish blowing station during which time the parisons are permitted to reheat, then closing the blow mold 12 and finish blowing the ware, and finally opening the blow mold 12 to release the ware.

The cycles of operation may be so arranged that the blow molds are active almost continuously. That is to say, the ware may be taken out of each blow mold immediately before fresh parisons are delivered thereto by the neck rings. The parison mold may be kept in operation almost continuously because the cooling of the neck rings 15 and parison molds 30 is a continuous operation, and as soon as the parisons are transferred to the blow mold 12 and the neck rings 15 returned to the blank forming station, the blank molds 30 are then in a temperature condition to immediately receive another charge for the pressing of succeeding parisons for subsequent transfer to the blow mold 12 during the time that the parisons previously formed in the same blank molds are being blown to final form in the associated blow mold 12. When the parisons are formed, that is to say, when the pressing operation is concluded, the blank mold is stripped from the parisons, leaving the bare parisons supported in inverted position by the neck rings 15.

The stripping movements of the parison molds 30 are concurrent with the transfer movements of the neck molds 15. For example, as the mold holder 31 and molds 30 move directly, vertically upward away from the inverted shaped parisons, they move in a straight vertical line for a certain distance and then swing horizontally while continuing the vertical movement. At the instant of completion of the horizontal swing of the blank molds 30 or just slightly before, the neck molds 15 start to swing upwardly and around the fulcrum shaft 220 to the blow mold position. At this point the blow mold 12 closes about the parisons, the neck rings 15 open and swing back to the press position and the parison molds 30 swing down upon and in register with the neck rings 15. During the preceding operations both the neck molds and the parison molds are being cooled.

This practically continuous operation of the blank and blow molds renders it possible to press the parisons in the blank molds during the time that the parisons previously pressed in the same blank molds are being blown to final form in the associated blow mold and because these molds 15 and 30 are designed for high speed cooling and are efficiently and continuously cooled in a vertically spaced type of zonal cooling they may be successively and rapidly used for forming parisons at extremely high speeds.

This increased speed of production, made possible by correctly proportioning the walls of the molds to the mass of the glass and properly proportioning the application or impingement of cooling air to the proportioned ribs thereof, enables a very high increase in the bottles per mold per minute to be obtained by these molds.

The savings in weight of metals required over that of ordinary molds will also be considerable and the ease of making these molds and interchanging same will be enhanced.

From the foregoing it will be apparent that a relatively simple molding system has been devised and utilized.

Modifications may be resorted to within the spirit and scope of the appended claims.

We claim:

1. In a glassware forming machine, a neck mold mechanism comprising an invert shaft, a pair of neck mold arms connected to said shaft for parison invert movement on said shaft and lateral movement toward and away from each other along said shaft, a split neck mold comprised of a pair of complementary half-sections supported by said arms, a fluid operated motor comprising a pair of opposed cylinders and pistons, each of said pistons being connected to one of said arms, spring means engageable with each of said arms urging said arms inwardly toward each other to close said split neck mold, a source of fluid under pressure, and valve means controlling said fluid pressure for first applying fluid pressure inwardly against one end of each of said pistons to close said molds, then to release said pressure and subsequently to apply fluid pressure outwardly against the opposite end of each of said pistons to open said split neck mold.

2. In a glassware forming machine, a neck mold mechanism comprising an invert shaft, a pair of neck mold arms connected to said shaft for parison invert movement on said shaft and lateral movement toward and away from each other along said shaft, a split neck mold comprised of a pair of complementary half-sections supported by said arms, a fluid operated motor comprising a pair of opposed cylinders and pistons, each of said pistons being connected to one of said arms, spring means in said cylinders and engaging said pistons urging said arms inwardly toward each other to close said split neck mold, a source of fluid under pressure, and valve means controlling said fluid pressure for first applying fluid pressure inwardly against one end of each of said pistons to close said molds, then to release said pressure and subsequently to apply fluid pressure outwardly against the opposite end of each of said pistons to open said split neck mold.

3. In a glassware forming machine, a neck mold mechanisms comprising an invert shaft, a pair of neck mold arms connected to said shaft for parison invert movement on said shaft and lateral movement toward and away from each other along said shaft, a split neck mold comprised of a pair of complementary half-sections supported by said arms, a fluid operated motor comprising a pair of opposed cylinders and pistons, each of said pistons being connected to one of said arms, spring means engageable with each of said arms urging said arms inwardly toward each other to close said split neck mold, a source of fluid under pressure, valve means controlling said fluid pressure for first applying fluid pressure inwardly against one end of each of said pistons to close said molds, then to release said pressure and subsequently to apply fluid pressure outwardly against the opposite end of each of said pistons to open said split neck mold, coolant channels in said arms extending and opening to the outer peripheral walls of said half sections to apply coolant to said walls, and means connecting said coolant channels to said source of fluid under pressure concomitantly with the application of fluid pressure to said one end of said pistons.

4. The apparatus defined in claim 3 in which said coolant channels communicate with said cylinders and include restricting means for applying coolant at high velocity to said walls.

5. The apparatus defined in claim 3 in which the outer peripheral walls of said half sections have equally spaced, annularly disposed axially extending slots, said coolant channels communicating with said slots.

References Cited by the Examiner

UNITED STATES PATENTS

| | | | |
|---|---|---|---|
| 1,632,992 | 6/1927 | Bragg | 65—355 |
| 1,633,028 | 6/1927 | La France | 65—355 |
| 1,641,497 | 9/1927 | La France | 65—355 X |
| 1,834,384 | 12/1931 | Cramer | 65—355 X |
| 2,288,454 | 6/1942 | Hobson | 65—235 X |
| 2,304,736 | 12/1942 | Louden | 65—360 X |
| 2,402,708 | 6/1946 | Stewart et al. | 65—355 |
| 2,565,749 | 8/1951 | Zappia | 65—361 |
| 2,668,395 | 2/1954 | Maillart | 65—235 |
| 2,702,444 | 2/1955 | Rowe | 65—235 X |
| 2,949,701 | 8/1960 | Olson et al. | 65—235 |
| 2,994,986 | 8/1961 | Rowe | 65—235 |
| 3,047,982 | 8/1962 | Olson | 65—232 X |

DONALL H. SYLVESTER, *Primary Examiner.*